Sept. 24, 1929.  E. P. BLANKENSHIP ET AL  1,728,915
LINE SAVER AND RESTRAINER FOR DRILLING CABLES
Filed May 5, 1928  2 Sheets-Sheet 1
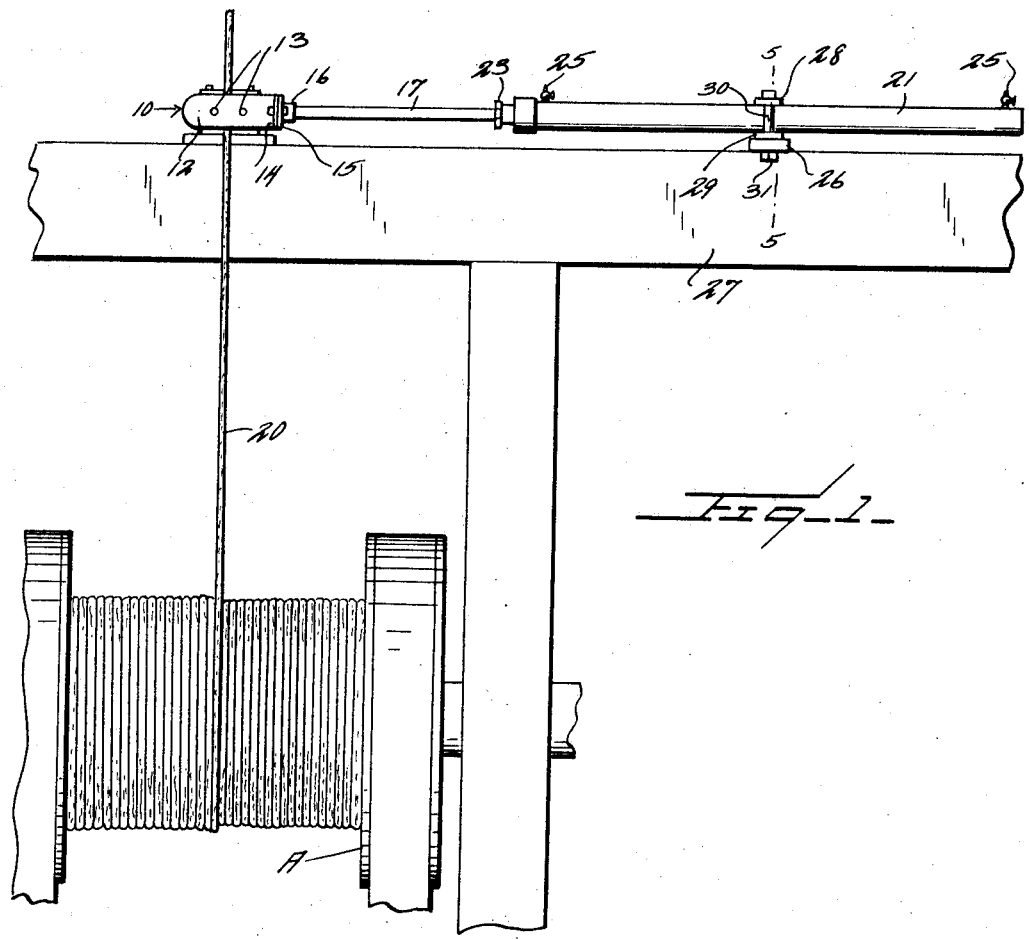
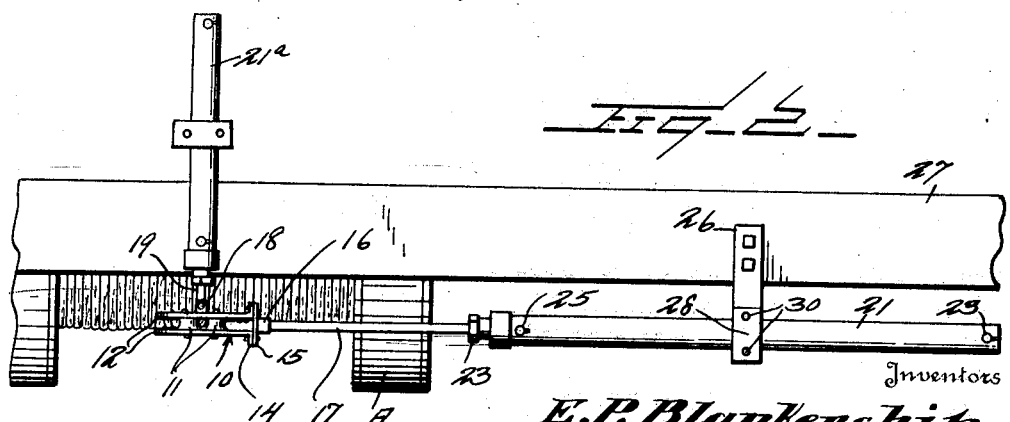
Inventors
E. P. Blankenship
E. W. Bell
By Watson E. Coleman
Attorney

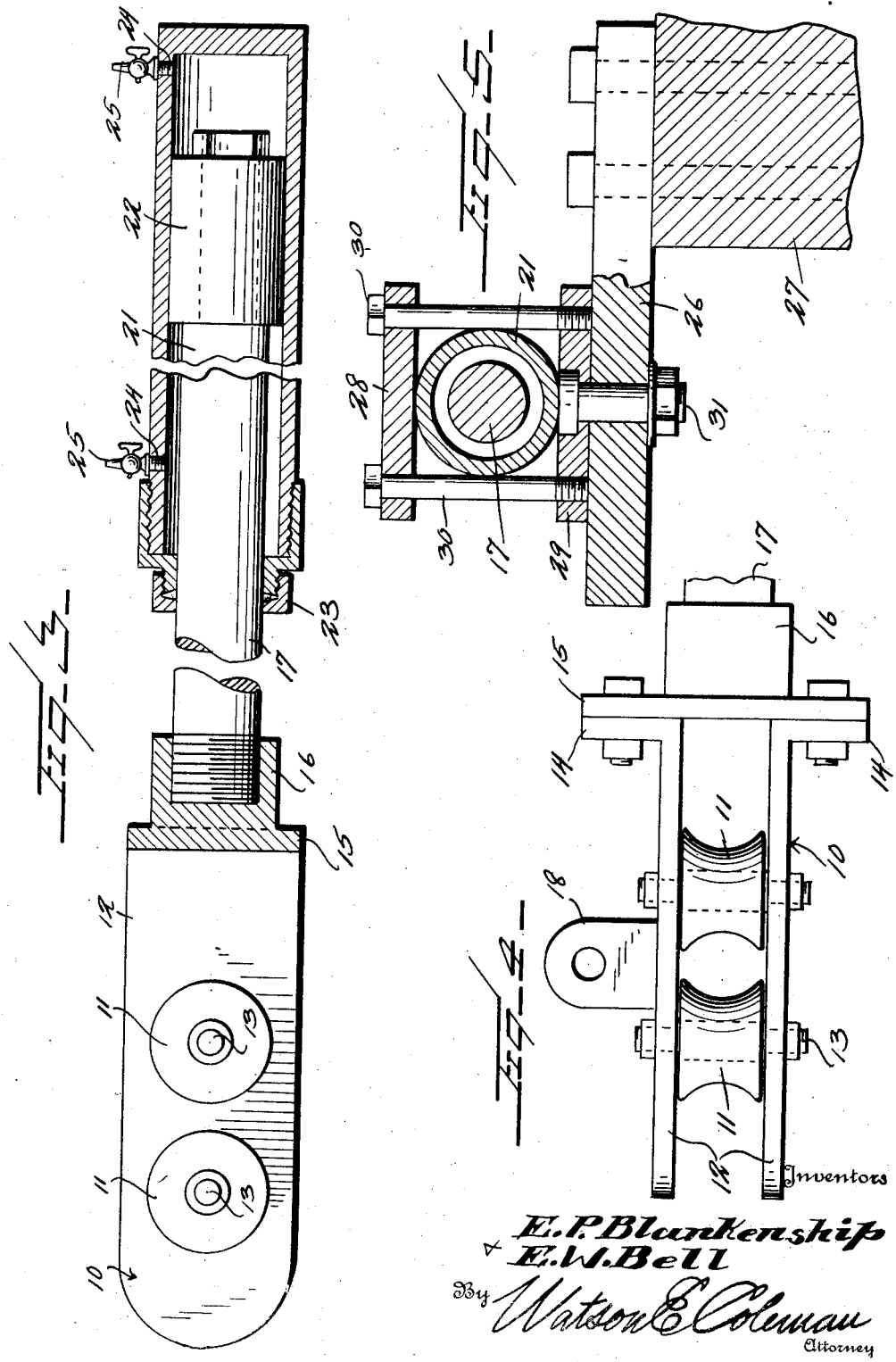

Patented Sept. 24, 1929.

1,728,915

UNITED STATES PATENT OFFICE

EARL P. BLANKENSHIP AND EDWARD W. BELL, OF SEMINOLE, OKLAHOMA

LINE SAVER AND RESTRAINER FOR DRILLING CABLES

Application filed May 5, 1928. Serial No. 275,538.

This invention relates to appliances designed to be used with drilling rigs in which there is a relatively long wire line running from the winding spool to the crown block.
In rigs of this character, this long wire line is very liable to whip, as there is a distance of about one hundred and twelve feet from the spool to the crown block and the line traveling at a high speed whips and balls up on the spool and cuts through. Thus the wire has to be discarded.

The general object of the present invention is to provide an appliance which will cause the wire to spool evenly on the spool, thus saving the line from overlapping and cutting and preventing it from whipping.

A further object is to provide a device of this character which includes a cable guide having pulleys through which the cable passes, the pulleys being mounted upon a yoke or head and the head connected by piston rods to a plurality of cylinders having air therein on opposite sides of the pistons, the confined air within the cylinders permitting a movement of the pistons but restraining undue movement thereof and, therefore, restraining undue movement or whipping of the line or cable.

A still further object is to provide a device of this character so constructed that the movement of the cylinders can be rendered more or less free, as desired, by the proper adjustment of air vent valves.

Other objects will appear in the course of the following description.

Our invention is illustrated in the accompanying drawings, wherein:—

Figure 1 is a fragmentary elevation of a winding drum showing our line or cable restraining means applied thereto;

Figure 2 is a top plan view of the structure shown in Figure 1;

Figure 3 is a longitudinal sectional view through one of the restraining cylinders showing the piston and the yoke in elevation;

Figure 4 is a top plan view of the yoke;

Figure 5 is a section through the cylinder on the line 5—5 of Figure 1, the section being on an enlarged scale.
Referring to these drawings, it will be seen that our cable restrainer or line saver comprises a yoke or head, designated generally 10, having mounted therein a pair of pulleys 11. The head preferably consists of two longitudinal irons 12 and the pulleys 11 are mounted upon transverse bolts 13. Each of the irons 12 is flanged at its outer ends, as at 14, and at one end the irons 12 are connected by a transverse bar 15 having thereon a screw-threaded socket 16 with which a piston rod 17 may be engaged.

One of the bars 12 is provided with outwardly projecting lugs 18 to which another piston rod 19 is pivoted for swinging movement in the plane of the yoke or head 10. It will be understood that the yoke 10 may be formed in any other manner desired but that the pulleys 11 are supported in spaced relation to each other to permit the passage between them of the line or cable 20. The piston rod 17 extends into a cylinder 21 and carries upon it the piston 22, the piston being held in place by nuts on the rod or in any other manner. The piston is preferably about six inches long and the cylinder is preferably about four feet long.

The piston rod extends through a stuffing box 23 of any usual or suitable construction. The cylinder is provided on each side of the piston with the air vents 24, passage through which is controlled by valves 25. By reducing the effective area of the passage through the vents or increasing this effective area, the movement of the piston within the cylinder may be controlled. The cylinders are preferably about two and a half inches in diameter. The cylinder is operatively pivoted upon a supporting iron or bracket 26 which is bolted to a beam 27 and projects out therefrom. The cylinder is mounted within a saddle comprising an upper bar 28 and a lower cross bar 29 with bolts 30 connecting these bars and holding tight upon the cylinder. The lower bar 29 has extending through it a pivot bolt 31 of any suitable construction whose head is countersunk in the bar 29. Thus the saddle and the cylinder engaged thereby may be swung in a horizontal plane at right angles to the direction of the cable 20 and toward or from the vertical axis of the rotary drilling machine, if this appliance is used upon a rotary.

The piston rod 19 extends into a second cylinder 21ª which is mounted upon a beam in substantially the same manner as the cylinder 21 for pivotal movement in a horizontal plane. Inasmuch as the construction of the cylinder and the mounting thereof is the same as for the cylinder 21, it is not believed necessary to describe the mounting of the second cylinder.

The cable 20 passes from the spool A upward to the crown block of the derrick (not shown) and its tendency to whip is restrained by the pistons 22 and the cylinders 21 and 21ª. In order to permit the pistons to move, air must be forced out of the cylinder through one or the other of the air vents and the relatively small air vent so restrains the movement of the air outward or inward that the piston 22 is retarded in its movement. The cylinders are so mounted that the line or cable may move inward, that is, toward the axial center of the rotary or away from said axial center or toward the right or toward the left, but any movement of the cable from a direct line leading from the spool to the crown block is yieldingly resisted by these dash pots, as they may be termed, formed by the cylinders 21 and 21ª and the pistons operating therein.

We have found in actual use that this appliance holds the wire line so that it will not whip, or in other words it holds the wire line rigid and taut and absolutely prevents all whipping. It is this whip that causes the wire to ball up on the spool and cut through the spool, thus stranding the cable and causing it to be discarded. Our guide will cause the line to spool evenly, thus saving the line from overlapping and cutting.

While we have described this device as particularly applicable to drilling machines of the rotary or any other type, we do not wish to be limited to this use of the guide as it is obvious that it might be used in any situation where a long line is carried from a spool to a pulley at some distance away, which line is run at high speed and is liable to whip.

We claim:—

1. The combination with a spool and a cable wound thereon and extending therefrom, of means for preventing whipping of the cable comprising a yoke having pulleys thereon between which the cable passes and by which the cable is guided, pneumatic means yieldingly resisting movement of the yoke in any direction comprising a plurality of cylinders disposed at angles to each other and pivoted for swinging movement each toward or from the other cylinder, pistons operating therein, and connecting rods leading from the pistons to the yoke and operatively connected thereto, the cylinders on each side of the pistons having air vents.

2. The combination with a spool and a cable wound thereon and extending therefrom, of means for preventing whipping of the cable comprising a yoke having pulleys thereon between which the cable passes and by which the cable is guided, pneumatic means yieldingly resisting movement of the yoke in any direction comprising a plurality of cylinders pivoted each for movement toward or from the other cylinder, pistons operating therein, connecting rods leading from the pistons to the yoke and operatively connected thereto, the cylinders on each side of the pistons having air vents, and valves controlling passage through said air vents and adjustable to increase or decrease the effective area of the vents.

3. The combination with a spool having a cable thereon, the cable extending from the spool, of means for preventing the whipping of the cable comprising pivoted cylinders disposed in angular relation to each other, a yoke having pulleys between which the cable passes, connecting rods extending from said yoke into said cylinders and provided with pistons operating within the cylinders, each cylinder having air vents adjacent opposite ends thereof, and valves for controlling the passage of air through said vents.

4. The combination with a spool and a cable wound thereon and extending therefrom, means for preventing the whipping of the cable and guiding it upon the spool comprising a yoke, pulleys on the yoke between which the cable passes, a piston rod connected to one end of the yoke, a cylinder into which the piston rod passes, the cylinder being pivoted for movement in a plane at right angles to the line of the cable and the cylinder having valved air vents at its opposite ends, and a second cylinder disposed approximately at right angles to the first named cylinder and having a piston rod pivotally connected to the yoke, the last named cylinder having valved air vents at its opposite ends.

5. A cable guide of the character described comprising a yoke having pulleys disposed adjacent to each other and between which a cable is adapted to pass, two pneumatic cylinders disposed in angular relation to each other and pivoted for swinging movement toward or from the other cylinder, each cylinder having air vents at its opposite ends, and valves for controlling the vents, and a piston rod having a piston disposed within each cylinder between the vents, the outer end of each piston rod being operatively connected to the yoke.

In testimony whereof we hereunto affix our signatures.

EARL P. BLANKENSHIP.
EDWARD W. BELL.